(12) United States Patent
Murakami et al.

(10) Patent No.: US 8,257,453 B2
(45) Date of Patent: Sep. 4, 2012

(54) METHOD AND DEVICE FOR GASIFYING GASIFICATION FUEL

(75) Inventors: Takahiro Murakami, Koto-ku (JP); Koubun Kyo, Koto-ku (JP); Toshiyuki Suda, Koto-ku (JP)

(73) Assignee: IHI Corporation, Tokyo (JP)

( * ) Notice: Subject to any disclaimer, the term of this patent is extended or adjusted under 35 U.S.C. 154(b) by 438 days.

(21) Appl. No.: 12/526,786

(22) PCT Filed: Feb. 22, 2007

(86) PCT No.: PCT/JP2007/000114
§ 371 (c)(1),
(2), (4) Date: Aug. 12, 2009

(87) PCT Pub. No.: WO2008/102415
PCT Pub. Date: Aug. 28, 2008

(65) Prior Publication Data
US 2010/0018121 A1    Jan. 28, 2010

(51) Int. Cl.
*B01J 7/00* (2006.01)
*C01B 3/36* (2006.01)
*C01B 6/24* (2006.01)
*C10J 3/00* (2006.01)

(52) U.S. Cl. .............. 48/197 R; 48/61; 48/210; 423/644

(58) Field of Classification Search .................. 48/61
See application file for complete search history.

(56) References Cited

U.S. PATENT DOCUMENTS
4,519,810 A * 5/1985 Haas ............................... 48/202

FOREIGN PATENT DOCUMENTS

| | | |
|---|---|---|
| DE | 35 36 717 A1 | 4/1986 |
| GB | 2 167 679 A | 6/1986 |
| JP | 62-37608 | 2/1987 |
| JP | 05-339586 A | 12/1993 |
| JP | 11-181450 | 7/1999 |
| JP | 2003-251168 | 9/2003 |
| JP | 2004-196831 | 7/2004 |
| JP | 2005-041959 A | 2/2005 |
| JP | 2006-132885 | 5/2006 |

OTHER PUBLICATIONS

Masayuki Horio et al, eds., "Fluidization Handbook", Association of Powder Process Industry & Engineering, Mar. 25, 1999, p. 182 (with partial English translation).
Office Action issued Sep. 13, 2011, in German Patent Application No. 11 2007 003 339 .8 with English translation.

* cited by examiner

*Primary Examiner* — Matthew Merkling
(74) *Attorney, Agent, or Firm* — Oblon, Spivak, McClelland, Maier & Neustadt, L.L.P.

(57) ABSTRACT

An object of the invention is to enhance gasification efficiency of flammable solid content when high fuel ratio fuel having fixed carbon content in large quantity is to be gasified. A material downcomer 11 for introduction of bed material 10 separated in a material separator 9 and a fuel supply port 21 for introduction of gasification fuel 12 are arranged at one side of a gasification furnace 2; a solid content supply port 19 for supply of flammable solid content 18 and the bed material 10 in the gasification furnace 2 to the combustion furnace 1 is arranged at the other side of the gasification furnace 2. In the gasification furnace 2 and between the one and the other sides of the furnace 2, vertical partition plates 22 are arranged to provide a zigzag curved flow passage 23 with upper and lower turns.

9 Claims, 3 Drawing Sheets

METHOD AND DEVICE FOR GASIFYING GASIFICATION FUEL

TECHNICAL FIELD

The present invention relates to a method and a device for gasifying gasification fuel and especially relates to a method and a device for gasifying gasification fuel which enable effective gasification of high fuel ratio fuel.

BACKGROUND ART

There have been proposed various fluidized-bed gasification furnaces for producing decomposition gas, using solid fuel such as coal or organic waste as fuel. One of such fluidized-bed gasification furnaces is called synthesized gasification furnace which comprises gasification and char combustion chambers each of which is supplied at its bottom with fluidizing gas to provide a fluidized bed, said chambers being partitioned by a partition wall with a bottom opening and being integrally configured as a whole. Bed material is circulated between the chambers via the opening on the partition wall; char (flammable solid content) is entrained in and conveyed by the bed material from the gasification chamber to the char combustion chamber, and the bed material having been heated by burning the char (flammable solid content) in the char combustion chamber is transferred from the char combustion chamber to the gasification chamber (see, for example, Reference 1).

In the device shown in Reference 1, the gasification and char combustion chambers are arranged side by side with the single partition therebetween, part of the flammable solid content produced in the gasification chamber being guided through the opening into and burned in the combustion chamber. However, movement of the flammable solid content from the gasification chamber to the char combustion chamber is drifting or catch-as-catch-can basis and may disadvantageously be extremely unstable. To overcome this, there are provided in Reference 1 highly and low fluidized regions with high and low fluidizing-gas superficial velocities so as to control fluidization of the flammable solid content. However, even if the superficial velocities are controlled in this manner, it is impossible to effectively feed only the flammable solid content having been sufficiently gasified in the gasification chamber to the char combustion chamber; thus, the flammable solid content is fed to the char combustion chamber with part of the flammable solid content being insufficiently gasified. As a result, in a case where gasification fuel is high fuel ratio fuel such as coal having fixed carbon content in large quantity, or fuel (organic waste, mixed fuel or the like) mingled with high fuel ratio raw material having fixed carbon content in large quantity, there is a problem that high gasification efficiency cannot be obtained since effective arrestment in the gasification chamber of only the flammable solid content derived from the high fuel ratio fuel cannot be conducted for promotion of gasification.

In order to overcome the problems in Reference 1, the applicant proposed a device for gasifying gasification fuel (see Reference 2), using an external circulation type combustor.

FIG. 1 schematically shows a gasification device which uses the combustor of Reference 2 to generate useful flammable gas from gasification fuel. The gasification device comprises a combustion furnace 1 for mainly burning flammable solid content and a gasification furnace 2 for mainly gasifying gasification fuel. To a lower part of the combustion furnace 1, air 3 and starting fuel 4 such as city gas, kerosene or heavy oil are fed and are burned in mixture while being bubbled with bed material such as sand, whereby a fluidized bed 5 is formed for heating of bed material; further, a high-temperatured freeboard 6 is formed in the combustion furnace 1 and above the fluidized bed 5. Shown in FIG. 1 is an air diffuser plate 7 through which the air 3 is blown into the furnace 1 for formation of the fluidized bed 5; alternatively, a conventionally employed air diffusing nozzle may be used for blowing the air 3 into the furnace 1 for formation of the fluidized bed 5. Supply of the starting fuel 4 is reduced as gasification fuel 12 is supplied as mentioned below; the supply of the starting fuel is eventually stopped.

A top of the combustion furnace 1 is connected with an exhaust gas pipe 8. Exhaust gas discharged through the pipe 8 is guided into a material separator 9 (hot cyclone) for separation of bed material 10 entrained in the gas. The bed material 10 separated in the separator 9 is supplied through a material downcomer 11 into the gasification furnace 2.

A top of the gasification furnace 2 has a fuel supply port 13 through which fed is gasification fuel 12 such as fuel like coal or coke having fixed carbon content in large quantity (hereinafter referred to as high fuel ratio fuel), organic waste such as various waste or sludge, or combination thereof. A bottom of the gasification furnace is fed with steam 14, the steam 14, high-temperatured bed material 10 and gasification fuel 12 being bubbled together to form a fluidized bed 15; the gasification fuel 12 is gasified by the high-temperatured bed material 10. Shown in FIG. 1 is an air diffuser plate 7a through which the steam 14 is blown into the furnace 2 for formation of the fluidized bed 15; alternatively, a conventionally employed air diffusing nozzle may be used for blowing the steam 4 into the furnace 2 for formation of the fluidized bed 15.

Flammable gas 16 generated by gasifying the gasification fuel 12 is taken out through an output port 17 on the top of the gasification furnace 2. The flammable gas 16 is supplied to a utilization device such as a turbine for power generation.

Flammable solid content 18 also generated by gasifying the gasification fuel 12 in the furnace 2 is gradually pushed and moved from right side to left side in FIG. 1 by the bed material 10 continuously fed through the downcomer 11, and is supplied in a mixed state with the bed material 10 to the combustion furnace 1 through a solid content supply port 19 which connects, with declivity, a heightwise intermediate portion of a left side end of the gasification furnace 2 to the combustion furnace 1.

In the gasification device, the gasification fuel 12 supplied through the supply port 13 into the gasification furnace 2 is heated by the high-temperatured bed material 10 and contacts the steam 14 to bring about aqueous gasification reaction ($C+H_2O=H_2+CO$), whereby the flammable gas 16 such as CO and $H_2$ are generated together with flammable solid content 18. The generated flammable gas 16 is fed through the output port 17 of the furnace 2 to a utilization device (not shown) such as a turbine for power generation.

On the other hand, the flammable solid content 18 generated in the gasification furnace 2 is moved from one side (right side) to the other side (left side) in FIG. 1 by the bed material 10 continuously fed through the downcomer 11 and is fed together with the bed material 10 into the combustion furnace 1 through the supply port 19 on the left side end of the furnace 2. The supplied flammable solid content 18 is burned in the fluidized bed 5 to elevate in temperature the combustion gas and bed material in the combustion furnace 1. Exhaust gas 20 separated in the separator 9 is exhausted to atmosphere via an exhaust heat recovery device such as a boiler, an exhaust gas treatment device and the like (not shown).

[Reference 1] JP 2004-196831A
[Reference 2] JP 2006-132885A

SUMMARY OF THE INVENTION

Problems to be Solved by the Invention

In the gasification device of FIG. 1 representing the above-mentioned Reference 2, when the gasification fuel 12 supplied to the gasification furnace 2 is fuel such as organic waste having fixed carbon content in relatively small quantity and volatile portions in large quantity (low fuel ratio fuel), gasification easily proceeds and the flammable solid content 18*b* generated by gasification is relatively low in specific gravity. The flammable solid content 18*b* with low specific gravity is moved at a relatively upper part of the fluidized bed 15 as shown by dot-lined arrow, is gasified at relatively short times and flows through the supply port 19.

On the other hand, when fed to the furnace 2 is fuel such as coal or coke having fixed carbon content in large quantity (high fuel ratio fuel), or fuel (organic waste, mixed fuel or the like) mingled with high fuel ratio raw material having fixed carbon content in large quantity, the flammable solid content generated by gasification of the high fuel ratio fuel has high in specific gravity. Such flammable solid content 18*a* with high specific gravity tends to be accumulated on the bottom of the gasification furnace 2, and with the above-mentioned movement of the bed material 10 from the one side to the other side into the supply port 19, the accumulation of the flammable solid content 18*a* with the high specific gravity is uneven or one-sided toward the supply port 19.

As a result, newly generated flammable solid content 18*a* with high specific gravity from high fuel ratio fuel fed into the furnace 2 tends to be passed above the accumulated flammable solid content 18*b* as shown by solid arrows to flow through the supply port 19, so that the flammable solid content 18*a* with high specific gravity is caused to be supplied to the combustion furnace 1 while it is not satisfactorily gasified, failing to effectively enhance the gasification ratio of the flammable solid content 18*a* with high specific gravity when high fuel ratio fuel is fed.

The invention was made in view of the above and has its object to provide a method and a device for gasifying gasification fuel which can enhance gasification efficiency especially when high fuel ratio fuel having fixed carbon content in large quantity is gasified.

Means or Measures for Solving the Problems

The invention is directed to a method for gasifying gasification fuel wherein exhaust gas from a combustion furnace is guided to and separated in a material separator from bed material, the separated bed material and gasification fuel being fed to a gasification furnace where the gasification fuel is gasified by a fluidized bed using steam to take out flammable gas, flammable solid content generated in the gasification furnace through gasification being fed together with the bed material into the combustion furnace to thereby burn the flammable solid content by air to heat the bed material, said method for gasifying gasification fuel which comprises feeding the bed material separated in said material separator and the gasification fuel to one side in said gasification furnace, feeding the flammable solid content and the bed material in said gasification furnace to said combustion furnace through a solid content supply port provided at the other side of said gasification furnace, and arranging partition plates in said gasification furnace between said one and the other sides to provide a zigzag curved flow passage with upper and lower turns, whereby the gasification fuel and the bed material supplied to said one side in the gasification furnace are moved along said curved flow passage into gasification of the gasification fuel and are supplied through said solid content supply port at the other side.

In the method for gasifying gasification fuel, the gasification fuel may be high fuel ratio fuel.

In the method for gasifying gasification fuel, the gasification fuel may be organic waste.

In the method for gasifying gasification fuel, the gasification fuel may be a mixture of high fuel ratio fuel with organic waste.

The invention is also directed to a device for gasifying gasification fuel provided with a material separator for separating bed material from exhaust gas of a combustion furnace, a gasification furnace into which the bed material separated in the material separator is guided through a material downcomer and into which gasification fuel is guided through a fuel supply port to be gasified by a fluidized bed formed through steam so as to take out flammable gas, a solid content supply port for feeding flammable solid content generated by gasification in the gasification furnace and the bed material to the combustion furnace, and said combustion furnace into which the flammable solid content and the bed material are guided via said solid content supply port and in which the flammable solid content is burned by a fluidized bed formed through air to heat the bed material, said device for gasifying gasification fuel comprising the material downcomer for introducing the bed material separated in the separator and a fuel supply port for introducing gasification fuel, said material downcomer and said fuel supply port being arranged at one side of said gasification furnace, said solid content supply port arranged on the other side of said gasification furnace for feeding said flammable solid content and said bed material in said gasification furnace to said combustion furnace, and a zigzag curved flow passage with upper and lower turns constituted by vertical partition plates arranged in the gasification furnace between said one and the other sides thereof.

In the device for gasifying gasification fuel, the partition plates may be alternately arranged lower and upper partition plates, each of the lower partition plates having a lower end fixed to a bottom of the gasification furnace, each of the upper partition plates having a lower end spaced apart from the bottom of the gasification furnace by communication clearance.

In the device for gasifying gasification fuel, at the other side of the zigzag curved flow passage, an upward flow of the flammable solid content and bed material may be formed which is guided into the solid content supply port.

In the device for gasifying gasification fuel, said partition plates may be controlled with respect to mutual spacing.

According to the above-mentioned means, the following actions will be obtained.

In the above-mentioned method and device for gasifying gasification fuel of the invention, the gasification fuel fed to the gasification furnace is gasified by the fluidized bed in the gasification furnace into flammable gas and flammable solid content, the flammable gas being taken out to outside for utilization, for example, in power generation. Since the zigzag curved flow passage with the upper and lower turns is formed from the one to the other sides in the gasification furnace by arranging the plural vertical partition plates between the one and the other sides, all of the flammable solid content generated by gasification in the gasification furnace is passed through the curved flow passage from the one to the other sides, so that the flammable solid content is uniformly and sufficiently gasified before it is guided into the solid content supply port.

Effect of the Invention

According to the method and device for gasifying gasification fuel of the invention, the zigzag curved flow passage with the upper and lower turns is formed from the one side to the other side of the gasification furnace by arranging the plural vertical partition plates in spaced-apart relationship, so that all of the flammable solid content generated in the gasification furnace is passed through the curved flow passage from the one to the other sides of the furnace.

As a result, excellent effects and advantages can be obtained. Irrespective of whether, as gasification fuel, high fuel ratio fuel or organic waste is singularly used or a mixture of high fuel ratio fuel with organic waste is used, all of the flammable solid content generated by gasifying the gasification fuel is surely passed through the curved flow passage. Thus, overcome are the problems that the flammable solid content with high specific gravity is accumulated unevenly in the gasification furnace and that such accumulation causes newly generated flammable solid content with high specific gravity to be guided into the solid content supply port without sufficiently gasified. Especially, the gasification efficiency of the flammable solid content with high specific gravity derived from high fuel ratio fuel can be substantially enhanced, whereby generation efficiency (productivity) of the flammable gas can be substantially enhanced.

Figure 1:
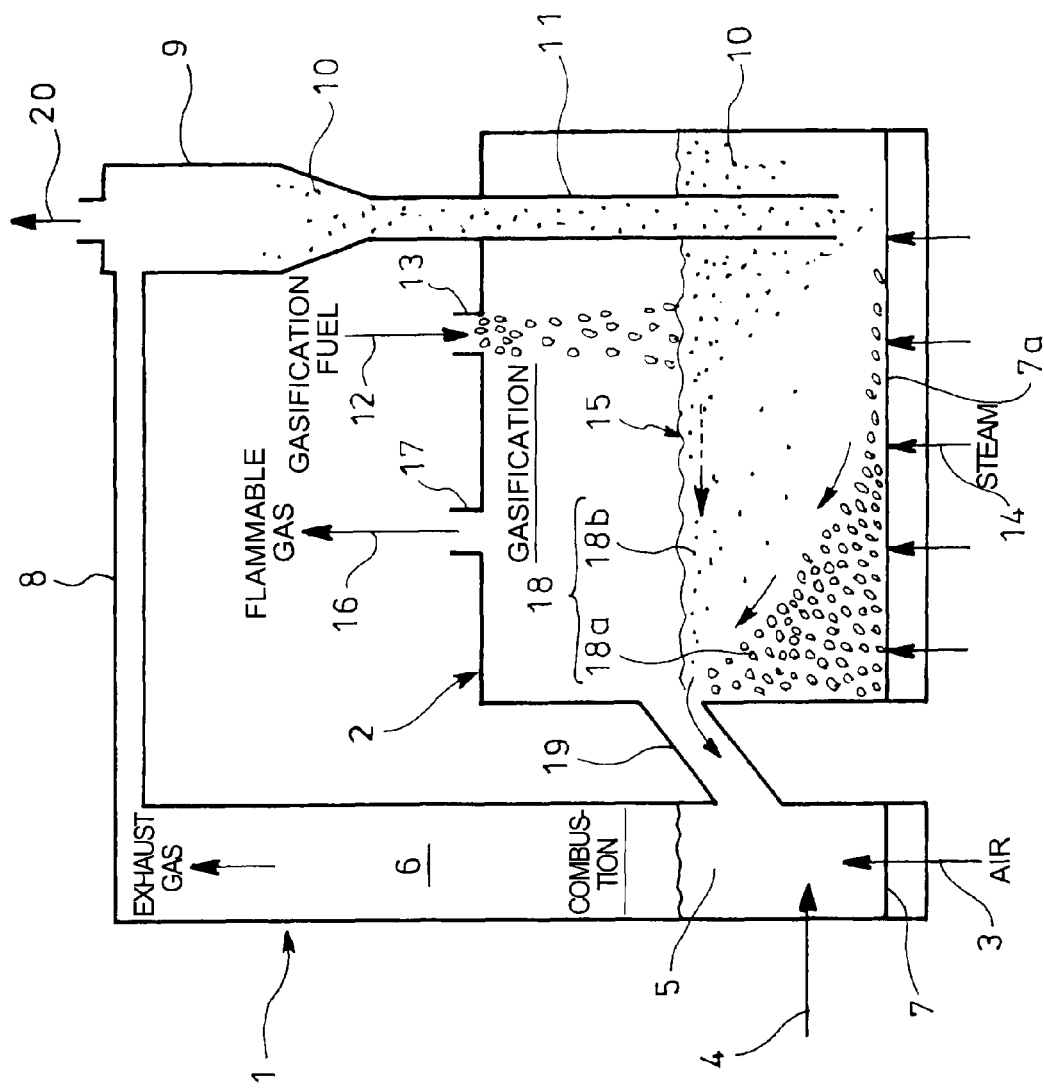
[FIG. 1] A schematic view showing a gasification device for generating flammable gas from gasification fuel, using a conventional combustor.

EXPLANATION OF THE REFERENCE CHARACTERS 1 combustion furnace
2 gasification furnace
3 air
5 fluidized bed
9 material separator
10 bed material
11 material downcomer
12 gasification fuel
14 steam
15 fluidized bed
16 flammable gas
18 flammable solid content
19 solid content supply port
21 fuel supply port
22 partition plate
22a lower partition plate
22b upper partition plate
23 curved flow passage
24 upward flow
S communication clearance

BEST MODE FOR CARRYING OUT THE INVENTION

An embodiment of the invention will be described in conjunction with the attached drawings.

Figure 2:
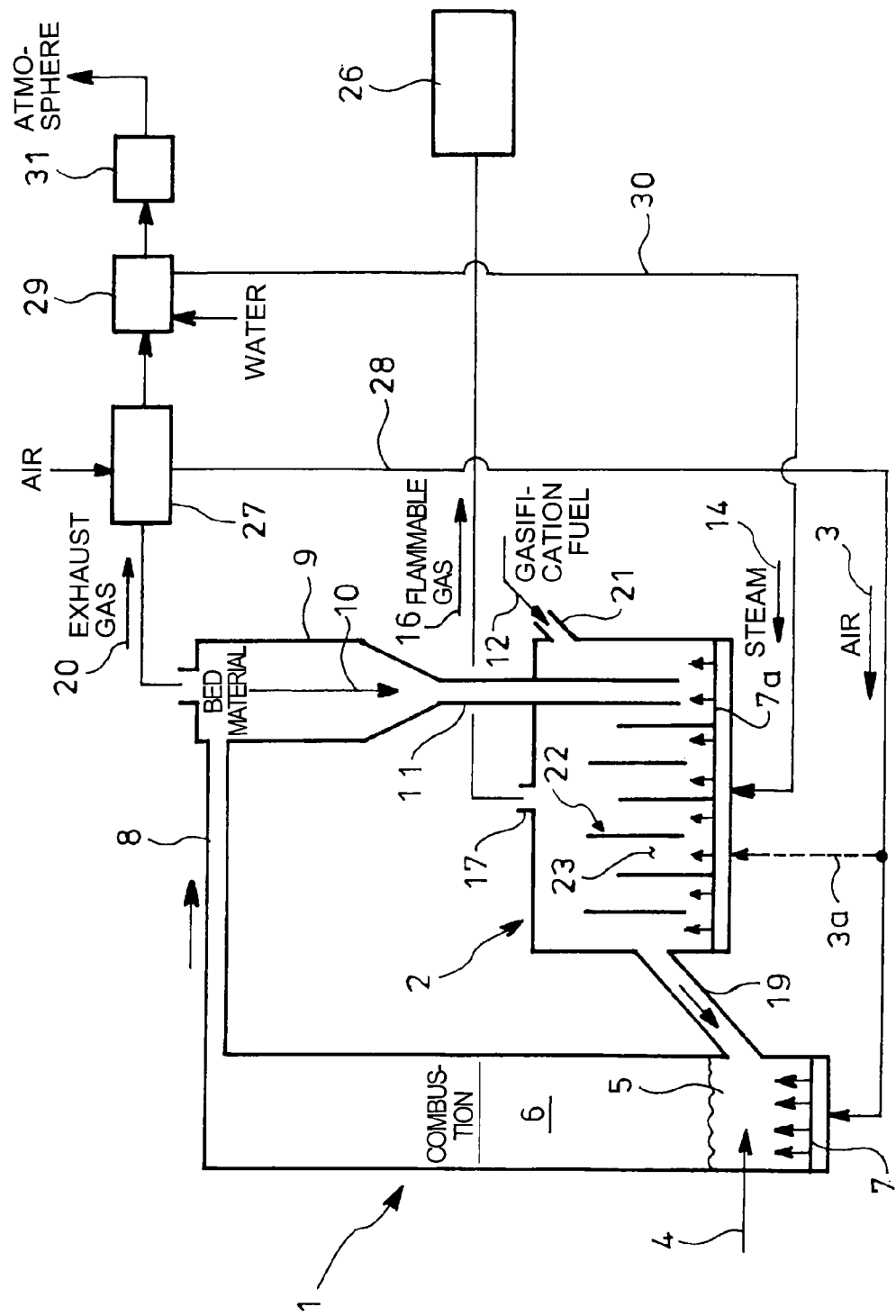
[FIG. 2] An overall schematic view showing a gasification device as an embodiment of the invention.
Figure 3:
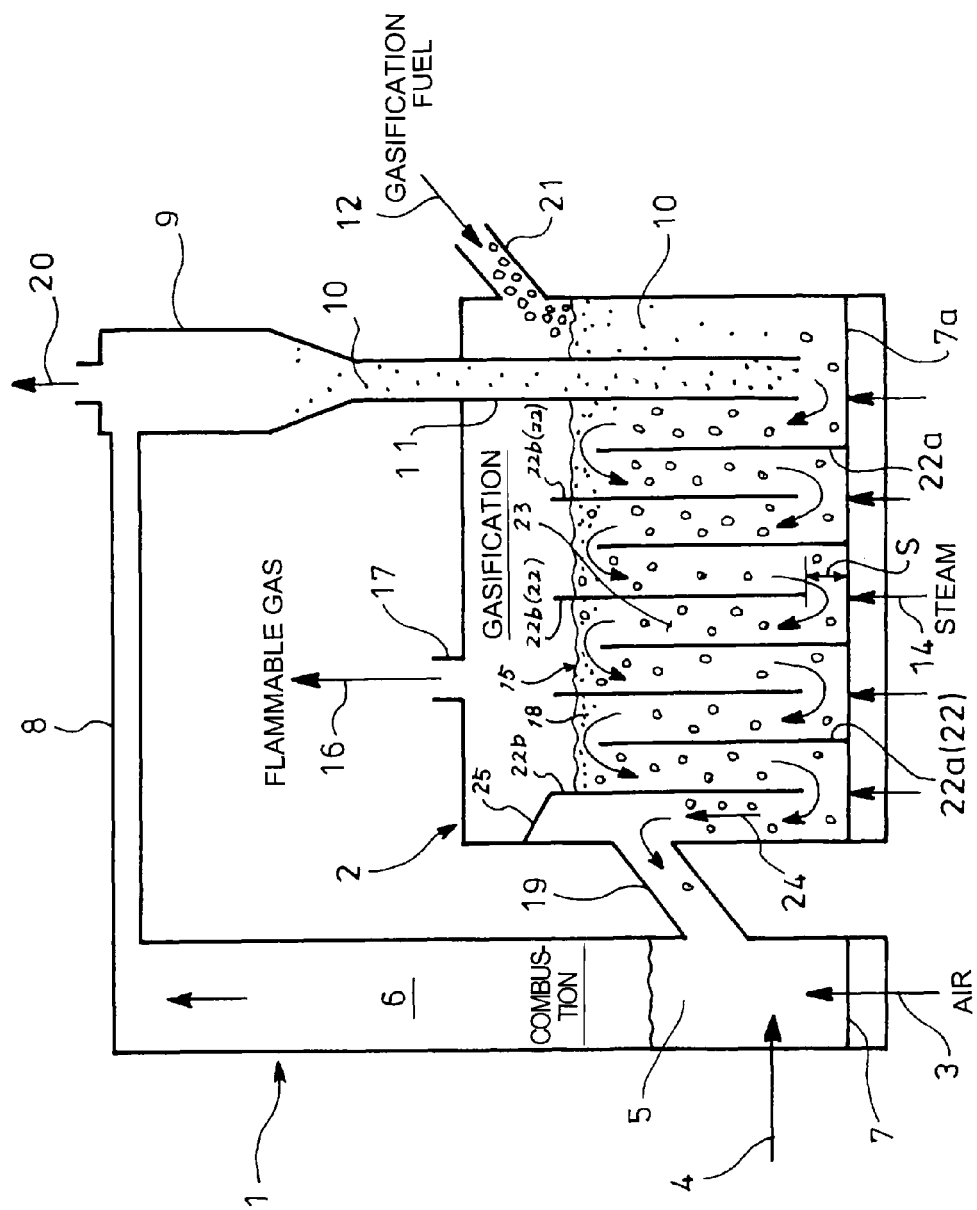
[FIG. 3] A schematic view showing main part of FIG. 2.

FIGS. 2 and 3 show the embodiment of the invention which enables enhancing gasification ratio of flammable solid content with high specific gravity when especially high fuel ratio fuel is fed to a gasification furnace 2 in FIG. 1; parts identical with those in FIG. 1 are represented by the same reference characters and explanation thereon is omitted. Only characterizing features of the invention will be described in details.

As shown in FIGS. 2 and 3, a material downcomer 11 which guides bed material 10 separated in a material separator 9 into a gasification furnace 2, and a fuel supply port 21 which guides gasification fuel 12 into the furnace 2 are arranged in the gasification furnace 2 at one side of the furnace 2 (right side in FIGS. 2 and 3); a solid content supply port 19 is arranged at the other side of the gasification furnace 2 (left side in FIGS. 2 and 3) so as to feed flammable solid content 18 and bed material 10 in the gasification furnace 2 to a combustion furnace 1. The fuel supply port 21 is provided on a side wall at the one side end of the gasification furnace 2 (right side of FIGS. 2 and 3) and is adapted to feed the gasification fuel 12 while the gasification furnace 2 is kept sealed.

Within and between the one and the other sides of the gasification furnace 2, a plurality of vertical partition plates 22 are arranged in spaced apart relationship, so that a zigzag curved flow passage 23 with upper and lower turns is formed from the one to the other sides of the gasification furnace 2 by the partition plates 22.

The partition plates 22 shown are alternately arranged lower and upper partition plates 22a and 22b, each of the lower partition plates 22a having a lower end fixed to a bottom of the gasification furnace 2, each of the upper partition plates 22b having a lower end spaced apart from the bottom of the gasification furnace by communication clearance S. Each of the upper partition plates 22b has height which prevents particles of the fluidized bed 15 from being fluidized over an upper end of the partition plate.

At the other side of the zigzag curved flow passage 23, an upward flow 24 of the flammable solid content 18a and the bed material 10 is formed which is guided into the solid content supply port 19. An upper end of the upper partition plate 22b defining said upward flow is fixed and sealed by a seal plate 25 to a side wall of the gasification furnace 2 at the other side.

The partition plates 22 may be fixedly arranged in the gasification furnace 2; alternatively, for example, the partition plates 22 may be arranged detachably with respect to the gasification furnace 2 so that mutual spacing between the plates 22 may be controlled.

The flammable gas 16 generated by gasification in the gasification furnace 2 is supplied to a utilization device 26 as shown in FIG. 2. The utilization device 26 may be, for example, a gas turbine for power generation which uses the flammable gas 16 as fuel as it is, or a reforming device which reforms the flammable gas to produce $H_2$ rich fuel for a fuel cell or for production of liquid fuel such as ethanol or DME.

The exhaust gas 20 separated in the material separator 9 is guided to an air preheater 27 for preheating of air; the preheated air 3 is guided through an air pipe 28 to the combustion furnace 1 for formation of the fluidized bed 5.

The exhaust gas 20 is further guided to a steam generator 29 where it is heat-exchanged with water to generate steam; the generated steam 14 is guided through a steam pipe 30 to the gasification furnace 2 for formation of the fluidized bed 15. As the steam 14 fed to the gasification furnace 2, alternatively, stream generated by, for example, another boiler may be used. The exhaust gas 20 having been heat-exchanged as mentioned above is purified in an exhaust gas treatment device 31 and discharged to atmosphere.

When there is lack in heat amount necessary for gasifying the gasification fuel 12 in the gasification furnace 2, then part of the air 3 fed from the air preheater 27 to the combustion furnace 1 may be separated and the separated air 3a may be fed to the gasification furnace 2 for burning of part of the gasification fuel 12 (partial combustion) to thereby enhance in temperature the fluidized bed 15.

Next, mode of operation of the above embodiment shown in FIGS. 2 and 3 will be described.

Usable as the gasification fuel 12 fed to the gasification furnace 2 is high fuel ratio fuel such as coal or coke having fixed carbon content in large quantity, organic waste or a mixture of high fuel ratio fuel with organic waste.

In the gasification device, the gasification fuel 12 fed through the fuel supply port 21 at the one side of the gasification furnace 2 is heated through the fluidized bed 15 by the high-temperatured bed material 10 fed through the material downcomer 11 and contacts the steam 14 to bring about aqueous gasification reaction ($C+H_2O=H_2+CO$) to thereby generate the flammable gas 16 such as CO and $H_2$ and the flammable solid content 18. The generated flammable gas 16 is fed through the output port 27 of the gasification furnace 2 to the utilization device 26.

By gasifying the gasification fuel 12, the flammable solid content 18 is generated in the gasification furnace 2. Since the plural vertical partition plates 22 are arranged between the one and the other sides of the gasification furnace in spaced apart relationship to thereby form the zigzag curved flow passage 23 with the upper and lower turns from the one to the other sides in the gasification furnace 2, all of the flammable solid content 18 generated in the gasification furnace 2 is passed through the curved flow passage 23 from the one to the other sides, so that the flammable solid content 18 is uniformly and sufficiently gasified before it is guided into the solid content supply port 19.

That is, irrespective of whether, as the gasification fuel 12, high fuel ratio fuel or organic waste is singularly used or a mixture of high fuel ratio fuel with organic waste is used, all of the flammable solid content 18 generated by gasifying the gasification fuel 12 is surely passed through the curved flow passage. Thus, preventable are the problems that the flammable solid content 18a with high specific gravity is accumulated unevenly in the gasification furnace 2 and that such accumulation causes newly generated flammable solid content 18a with high specific gravity to be guided into the solid content supply port 19 without sufficiently gasified. Thus, especially the gasification efficiency of the flammable solid content 18a with high specific gravity derived from high fuel ratio fuel can be substantially enhanced.

Also in a case where the gasification fuel 12 used is organic waste partly containing high fuel ratio fuel or a mixture of high fuel ratio fuel with organic waste for co-gasification, preventable is the problem that the flammable solid content 18a with high specific gravity is unevenly accumulated in the gasification furnace, so that the gasification of the flammable solid content 18a with high specific gravity can be promoted to enhance the gasification efficiency of the gasification fuel 12 as a whole.

Thus, the gasification fuel 12 can be effectively gasified to substantially enhance generation efficiency (productivity) of the flammable gas 16.

It is to be understood that a method and a device for gasifying gasification fuel according to the invention is not limited to the above embodiment and that various changes and modifications may be made without departing from the scope of the invention.

INDUSTRIAL APPLICABILITY

The invention is applicable for gasifying gasification fuel in the form of high fuel ratio fuel such as coal or coke with fixed carbon content in large quantity, organic waste such as various waste or sludge, or a mixture of them.

The invention claimed is:

1. A method for gasifying gasification fuel wherein exhaust gas from a combustion furnace is guided to and separated in a material separator from bed material, gasification fuel and the separated bed material being fed to a gasification furnace where the gasification fuel is gasified by a fluidized bed using steam to take out flammable gas, flammable solid content generated in the gasification furnace through gasification being fed together with the bed material into the combustion furnace to thereby burn the flammable solid content by air to heat the bed material, said method for gasifying gasification fuel comprising:

feeding the gasification fuel and the bed material separated in said material separator to a first side in said gasification furnace;

feeding the flammable solid content and the bed material in said gasification furnace to said combustion furnace through a solid content supply port provided at a second side of said gasification furnace;

arranging partition plates in said gasification furnace between said first and second sides thereof to form a zigzag curved flow passage with upper and lower turns such that the flammable solid content and the bed material having passed through the zigzag curved flow passage form an upward flow toward the solid content supply port at the second side of the gasification furnace; and arranging a seal plate for gas sealing above the upward flow formed in the gasification furnace between the second side thereof and a partition plate to feed the flammable solid content and the bed material in the gasification furnace to the combustion furnace.

2. The method for gasification into gasification fuel as claimed in claim 1, wherein the gasification fuel is high fuel ratio fuel.

3. The method for gasifying gasification fuel as claimed in claim 1, wherein the gasification fuel is organic waste.

4. The method for gasifying gasification fuel as claimed in claim 1, wherein the gasification fuel is a mixture of high fuel ratio fuel with organic waste.

5. A device for gasifying gasification fuel comprising:

a combustion furnace in which flammable solid content is burned by a fluidized bed formed through air to heat bed material;

a material separator that separates the bed material from exhaust gas of the combustion furnace;

a material downcomer for introducing the bed material separated in the separator;

a fuel supply port that supplies the gasification fuel;

a gasification furnace into which the bed material separated in the material separator is guided through the material downcomer and into which the gasification fuel is guided through the fuel supply port to be gasified by a fluidized bed formed through steam so as to take out flammable gas, the material downcomer and the fuel supply port being arranged at a first side of the gasification furnace; and a solid content supply port that feeds both the flammable solid content, which is generated by gasification in the gasification furnace, and the bed material to the combustion furnace, the solid content supply port being arranged on a second side of the gasification furnace;

partition plates arranged in the gasification furnace between the first and second sides thereof to form a zigzag curved flow passage with upper and lower turns such that the flammable solid content and the bed material having passed through the zigzag curved flow passage form an upward flow toward the solid content supply port at the second side of the gasification furnace; and a seal plate for gas sealing arranged above the upward flow formed in the gasification furnace between the second side thereof and one of the partition plates.

6. The device for gasifying gasification fuel as claimed in claim 5, wherein the partition plates are alternately arranged lower and upper partition plates, each of the lower partition plates having a lower end fixed to a bottom of the gasification furnace, each of the upper partition plates having a lower end spaced apart from the bottom of the gasification furnace by communication clearance.

7. The device for gasifying gasification fuel as claimed in claim 5, wherein the partition plates are adapted to be controlled with respect to mutual spacing.

8. The device for gasifying gasification fuel as claimed in claim 5, wherein the exhaust gas separated in the separator is guided to an air pre-heater.

9. The device for gasifying gasification fuel as claimed in claim 6, wherein the upper partition plates are positioned at a height at which particles of the fluidized bed formed through steam are prevented from flowing over an upper end of the upper partition plates, respectively.

* * * * *